United States Patent [19]

Tanaka

[11] Patent Number: 4,800,511
[45] Date of Patent: Jan. 24, 1989

[54] METHOD OF SMOOTHING IMAGE DATA

[75] Inventor: Nobuyuki Tanaka, Kanagawa, Japan

[73] Assignee: Fuji Photo Film Co., Ltd., Kanagawa, Japan

[21] Appl. No.: 29,926

[22] Filed: Mar. 26, 1987

[30] Foreign Application Priority Data

Mar. 26, 1986 [JP] Japan .................................. 61-68174

[51] Int. Cl.$^4$ .............................................. G06F 15/68
[52] U.S. Cl. .................... 364/521; 364/518; 358/36; 358/167; 382/43
[58] Field of Search ............... 364/518, 520, 521, 519, 364/515; 358/167, 36, 227, 28, 37; 382/28, 43

[56] References Cited

U.S. PATENT DOCUMENTS

| 4,229,797 | 10/1980 | Ledley | 364/515 |
| 4,490,851 | 12/1984 | Gerhart et al. | 382/43 |
| 4,553,165 | 11/1985 | Bayer | 358/167 |
| 4,603,430 | 7/1986 | Sacks | 382/28 |
| 4,651,287 | 3/1987 | Tsao | 364/519 |
| 4,689,666 | 8/1987 | Hatanaka | 358/36 |
| 4,698,768 | 10/1987 | Thuy et al. | 364/521 |
| 4,715,005 | 12/1987 | Heartz | 364/521 |

Primary Examiner—Gary V. Harkcom
Assistant Examiner—Randy W. Lacasse
Attorney, Agent, or Firm—Sughrue, Mion, Zinn, Macpeak & Seas

[57] ABSTRACT

Original image data items $a_1, a_2, \ldots a_N$ with respect to a horizontal or vertical row of pixels in a two-dimensional image are obtained and then smoothed by converting $a_n$ to $a'_n$ which is the median value of $a_n$ ($a'_{n-1}+\alpha$), and ($a'_{n-1}-\alpha$) (where $a'_{n-1}$ is a converted data item which is produced by converting the original image data item $a_{n-1}$ to a median value, and $\alpha$ is a constant), converting $a_n$ to $a''_n$ which is the median value of $a_n$, $a''_{n+1}+\alpha$), and ($a''_{n+1}-\alpha$) (where $a''_{n+1}$ is a converted data item which is produced by converting the original image data item $a_{n+1}$ to a median value), and determining the means value $A_n$ of the converted data items $a'_n$ and $a''_n$ with respect to the same pixel and employing the determined mean value $A_n$ as smoothed data.

6 Claims, 7 Drawing Sheets

METHOD OF SMOOTHING IMAGE DATA

BACKGROUND OF THE INVENTION

1. Field of the Invention

The present invention relates to a method of smoothing image data.

2. Description of the Prior Art

Various methods of smoothing image data have heretofore been known in the art for decreasing or eliminating fluctuations or noise in image data. Study on data compression (highly efficient data coding) for efficient transmission and recording of image data has made much progress in recent years. In such data compression, the data smoothing is employed as a pretreatment process to increase a data compression efficiency. More specifically, by smoothing image data in predictive coding, the differential is reduced and the number of codes therefor may be reduced, and by smoothing image data in orthogonal transform coding, the converted data is concentrated in a low-frequency range. Therefore, the region in which the code length may be short is widened, and hence the data compression rate may be increased.

Among image data smoothing methods which are often employed normally are mean smoothing and median smoothing. According to the mean smoothing process, the image data of each pixel of a two-dimensional image is replaced with the mean value of data of a plurality of pixels (pixels within a mask size) including the pixel to be replaced. In the median smoothing method, the median value of each data item is used instead of the mean value in the above replacement process.

With the mean and median smoothing methods, those areas in which image data variations are large and small are uniformly smoothed. Therefore, if a high data smoothing effect were to be obtained, the area with a small image data variation would be excessively smoothed, thus losing image details. If such a difficulty were to be avoided, the area with a large image data variation would not sufficiently be smoothed. Any large variation left in image data after it has been smoothed is responsible for the prevention of an increase in the data compression rate.

SUMMARY OF THE INVENTION

It is an object of the present invention to provide a method of smoothing image data, capable of obtaining a high data smoothing effect while allowing image details to be left in smoothed image data, and of greatly increasing the data compression rate particularly when the method is applied to image data compression.

According to the present invention, a first method of smoothing image data comprises the steps of:

providing original image data items $a_1, a_2, \ldots a_N$ with respect to a series of pixels in a two-dimensional image, and a constant $\alpha$;

converting $a_n$ to $a'_n$ which is the median value of $a_n$, $(a'_{n-1}+0)$, and $(a'_{n-1}-\alpha)$ (where $a'_{n-1}$ is a converted data item which is produced by converting the original image data item $a_{n-1}$ to a median value);

converting $a_n$ to $a''_n$ which is the median value of $a_n$, $(a''_{n+1}+\alpha)$, and $(a''_{n+1}-\alpha)$ (where $a''_{n+1}$ is a converted data item which is produced by converting the original image data item $a_{n+1}$ to a median value); and determining the mean value $A_n$ of the converted data items $a'_n$ and $a''_n$ with respect to the same pixel and employing the determined mean value $A_n$ as smoothed data.

According to a second method of smoothing image data, the above process of determining the mean value of the converted data items $a'_n$ and $a''_n$ is effected with respect to both a horizontal row of pixels and a vertical column of pixels in a two-dimensional image to obtain mean values $A_n$, $B_m$ (where n, m are positions as counted from ends of the horizontal row and the vertical column), and the mean value $C_p$ (where p indicates a two-dimensional pixel position) of the mean values $A_p$, $B_p$ for the same pixel is determined and employed as smoothed data.

According to a third method of smoothing image data, the mean value A of the converted data items $a'_n$ and $a''_n$ is determined with respect to a horizontal row of pixels in a two-dimensional image. The third method also includes the steps of:

arranging determined mean values $A_1, A_2, \ldots A_M$ in a vertical column of pixels which extends transversely to said horizontal row, and a constant $\gamma$;

converting $A_m$ to $A'_m$ which is the median value of $A_m$, $(A'_{m-1}+\gamma)$, and $(A'_{m-1}-\gamma)$ (where $A'_{m-1}$ is a converted data item which is produced by converting the original image data item $A_{m-1}$ to a median value);

converting $A_m$ to $A''_m$ which is the median value of $A_m$, $(A''_{m+1}+\gamma)$, and $(A''_{m+1}-\gamma)$ (where $A''_{m+1}$ is a converted data item which is produced by converting the original image data item $A_{m+1}$ to a median value); and determining the mean value $D_m$ of the converted data items $A'_m$ and $A''_m$ with respect to the same pixel and employing the determined mean value as smoothed data.

The horizontal row of pixels and the vertical column of pixels used herein simply represent respective directions which intersect each other, and hence may mean vertical and horizontal directions, respectively, which are generally defined dependent on the size, contents, and arrangement of an actual two-dimensional image to be processed by the method of the present invention.

With the image data smoothing method of the present invention, the difference between data items of adjacent pixels falls within a prescribed range at all times, thereby providing a good data smoothing effect. Where the method of the present invention is employed as a pretreatment process for image data compression, the difference always comes within a prescribed range in predictive coding, or converted data items tend to concentrate in a low-frequency range in orthogonal transform coding, so that the data compression rate can be increased sufficiently. If the difference between data items of adjacent pixels is small, the values of these data items remain as they are, and hence image details will not be eliminated.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Like or corresponding parts are denoted by like or corresponding reference characters throughout several views.

Figure 1:
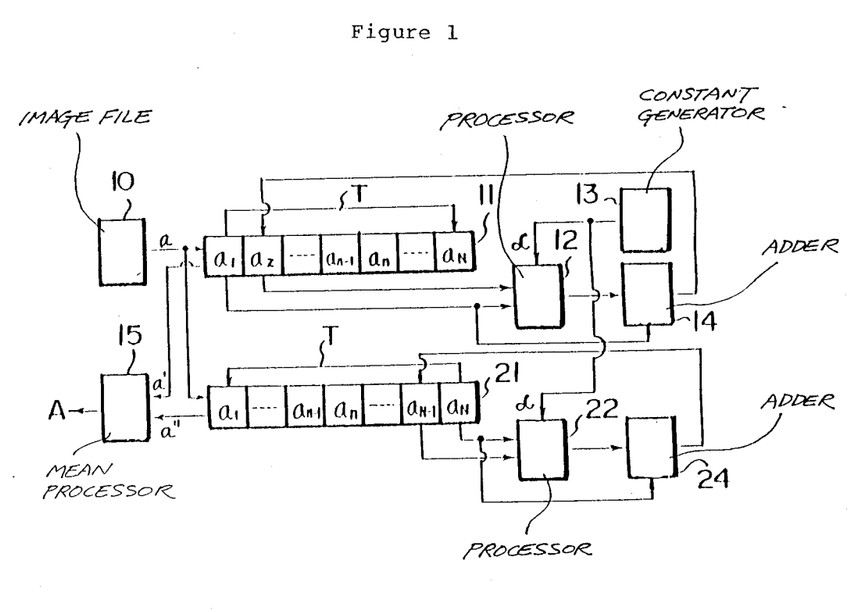
FIG. 1 is a block diagram of a system for carrying out an image data smoothing method according a first embodiment of the present invention.
Figure 2:
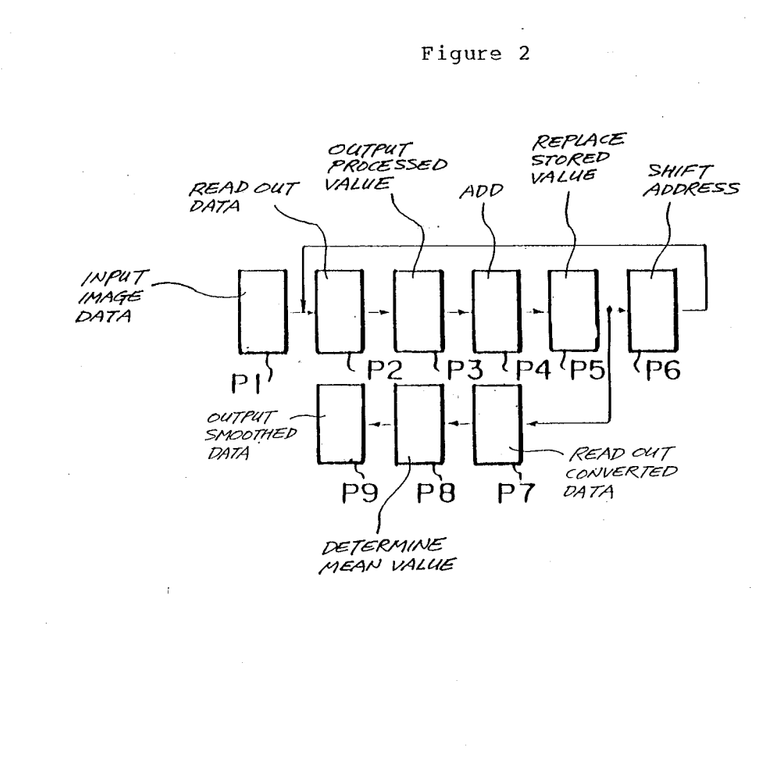
FIG. 2 is a flowchart of processing steps of the image data smoothing method of the first embodiment.
Figure 3:
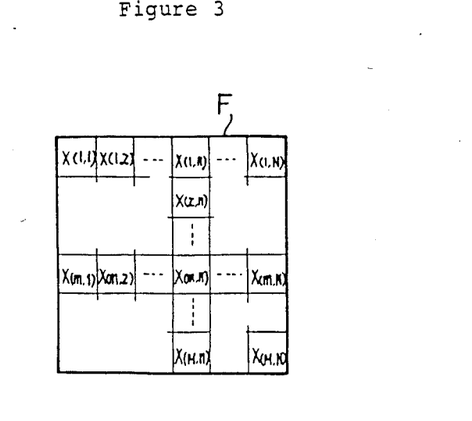
FIG. 3 is a diagram of a matrix of pixels.

FIG. 1 shows a system such as a computer system for carrying out a method of smoothing image data according to a first embodiment of the present invention. FIG. 2 illustrates an operation sequence of the system shown in FIG. 1. Original image data a stored in an image file 10 such as an optical disk, a magnetic disk, or other image information storage medium is input to and stored in each of line buffer memories 11, 21 (step P1 in FIG. 2). The original image data a is data of each pixel x of a two-dimensional image F as shown in FIG. 3. Original image data items a which correspond to a horizontal row of pixels in the pixel matrix shown in FIG. 3 are successively applied to both line buffer memories 11, 21. More specifically, original image data items $a_1$, $a_2$, ... $a_N$ of pixels $x(1, 1)$, $x(1, 2)$, ... $x(1, n)$, ... $x(1, N)$ in the uppermost horizontal row in FIG. 3 are first input to the line buffer memories 11, 21.

As is apparent from FIG. 3, the pixel $x(m, n)$ represents the pixel in the mth row from above and in the nth column from left in (M x N) pixels of the image F.

After the original image data items $a_1$, $a_2$, ... $a_N$ have successively been stored in the line buffer memory 11, the original image data items $a_1$ and $a_2$ are first read out and fed to a processor 12 (step P2). The processor 12 comprises a known comparator and compares the two original image data items $a_1$ and $a_2$ while being supplied with a constant $\alpha$ from a constant generator 13. The processor 12 then outputs:

$+\alpha$ if $a_2-a_1>\alpha$ $(a_2-a_1)$ if $|a_2-a_1|\leq\alpha$ $-\alpha$ if $a_2-a1<-\alpha$ (step P3).

The output from the processor 12 is fed to an adder 14 in which it is added to the original image data item $a_1$ read out of the line buffer memory 11 (step P4). The output from the adder 14 is delivered to the line buffer memory 11 and then a data item replaces the original image data item $a_2$ (step P5). The data item which has replaced the original image data item $a_2$ is referred to as a converted data item $a'_2$.

When the original image data item $a_2$ is replaced with the converted data item $a'_2$, the addresses of the image data items stored in the line buffer memory 11 are shifted one by one as indicated by the arrow T in FIG. 1 (step P6). Then, next two image data items are fed from the line buffer memory 11 to the processor 12. Since the addresses where the two image data items are to be read out of the line buffer memory 11 are fixed, an original data item $a_n$ before it is replaced and a converted data item $a'_{n-1}$ after replacement are generally applied to the processor 12. The processor 12 is then responsive to the two supplied data items $a_n$ and $a'_{n-1}$ for issuing outputs in the same manner as when the original image data items $a_1$, $a_2$ are supplied. In general, the processor 12 issues the following outputs:

$$+\alpha \text{ if } a_n-a'_{n-1}>\alpha \tag{1}$$

$$(a_n-a'_{n-1}) \text{ if } |a_n-a'_{n-1}|\leq\alpha \tag{2}$$

$$-\alpha \text{ if } a_n-a'_{n-1}<\alpha \tag{3}$$

The output from the processor 12 is fed to the adder 14, and added thereby to the image data item $a'_{n-1}$ read out of the line buffer memory 11. The output (converted data item) $a'_n$ from the adder 14 is sent to the line buffer memory 11 where it replaces the image data item $a_n$. Therefore, the original image data item $a_n$ is converted to the data item $a'_n$ which is:

$$a'_n=a'_{n-1}+\alpha \text{ for} \tag{1}$$

$$a'_n=a_n \text{ (no change) for} \tag{2}$$

$$a'_n=a'_{n-1}-\alpha \text{ for} \tag{3}$$

Stated otherwise, the original image data item $a_n$ is converted to $a'_n$ which is the median value of $a_n$, $(a'_{n-1}+\alpha)$, and $(a'_{n-1}-\alpha)$.

After the data item replacement, the addresses of the image data items stored in the line buffer memory 11 are shifted one by one as described above. Thereafter, the steps P2 through P6 are repeated (N−1) times so that the original data items $a_2$, $a_3$, ... $a_N$ are converted respectively to converted data items $a'_2$, $a'_3$, ... $a'_N$. The original data item $a_1$ is converted to a data item $a'_1$, but remains to be of the same value. The series of the converted data items $a'_1$, $a'_2$, ... $a'_N$ is read out of the line buffer memory 11 (step P7) and sent to a mean processor 15.

The line buffer memory 21 also contains the original image data items $a_1$, $a_2$, ... $a_N$, which are processed in the steps P2 through P7 of FIG. 2 by a processor 22, an adder 24, and the constant generator 13, the processor 22 and the adder 24 being identical to the processor 12 and the adder 14, respectively. However, the original image data items $a_N$ and $a_{N-1}$ are first read from the line buffer memory 21 into the processor 22, and the data item $a_{N-1}$ is replaced as a result of the comparison procedure. More specifically, If $a_{N-1}-a_N>\alpha$, the processor 22 issues $+\alpha$ and $a_{N-1}$ is replaced with $a''_{N-1}=a_N+\alpha$.

If $|a_{N-1}-a_N|\leq\alpha$, the processor 22 issues $(a_{N-1}-a_N)$ and $a_{N-1}$ remains to be of the same value but is changed to as $a''_{N-1}$.

If $a_{N-1} - a_N < -\alpha$, the processor 22 issues $-\alpha$ and $a_{N-1}$ is replaced with $a''_{N-1} = a_N - \alpha$.

Thus, the processor 22 generally outputs:

$$+\alpha \text{ if } a_n - a''_{n+1} > \alpha \quad (1)$$

$$(a_n - a''_{n+1}) \text{ if } |a_n - a''_{n+1}| = \leq \alpha \quad (2)$$

$$-\alpha \text{ if } a_n - a''_{n+1} < -\alpha \quad (3)$$

Therefore, the original image data item $a_n$ stored in the line buffer memory 21 is converted to the data item $a''_n$ which is:

$$a''_n = a''_{n+1} + \alpha \text{ for } (1)$$

$$a''_n = a_n \text{ (no change) for } (2)$$

$$a''_n = a''_{n+1} - \alpha \text{ for } (3)$$

Stated otherwise, the original image data item $a_n$ is converted to $a''_n$ which is the median value of $a_n$, $(a''_{n+1} + \alpha)$, and $(a''_{n+1} - \alpha)$. After the data item replacement, the addresses of the image data items stored in the line buffer memory 21 are shifted one by one. The steps P2 through P6 are repeated (N−1) times so that the original data items $a_1, a_2, \ldots a_{N-1}$ are converted respectively to converted data items $a''_1, a''_2, \ldots a''_{N-1}$. The original data item $a_N$ is converted to a data item $a''_N$, but remains to be of the same value.

The series of the converted data items $a''_1, a''_2, \ldots a''_N$ is read out of the line buffer memory 21 into the mean processor 15. The mean processor 15 processes the converted data items $a'_1, a'_2, \ldots a'_N$ from the line buffer memory 11 and the converted data items $a''_1, a''_2, \ldots a''_N$ from the line buffer memory 21 to determine the mean values of the converted data items with respect to the same pixels. For example, the converted data items $a'_1$ and $a''_1$ with respect to one pixel are processed to obtain their mean value $A_1$:

$$A_1 = (a'_1 + a''_1)/2$$

(step P8). The mean values $A_1, A_2, \ldots A_N$ thus obtained are output from the mean processor 15 as smoothed data items of the original image data items $a_1, a_2, \ldots a_N$ (step P9).

After the smoothed data items $A_1, A_2, \ldots A_N$ with respect to the uppermost horizontal row of pixels x(1, 1), x(1, 2), ... x(1, N) shown in FIG. 3 have been issued, original image data items $a_1, a_2, \ldots a_N$ with respect to the second horizontal row of pixels x(2, 1), x(2, 2), ... x(2, N) are delivered from the image file 10 to the line buffer memories 11, 21, and smoothed data items $A_1, A_2, \ldots A_N$ are determined by processing the original image data items $a_1, a_2, \ldots a_N$ in the same manner as described above.

The data processing cycles are successively executed until original data items with respect to the lowermost horizontal row of pixels x(m, 1), x(m, 2), ... x(m, n) shown in FIG. 3 are processed. The mean processor 15 outputs smoothed data A with respect to all pixels of the image F. The smoothed data A is fed to an image reproducing apparatus for reproducing the image or is subjected to image data compression, for example.

Figure 4:
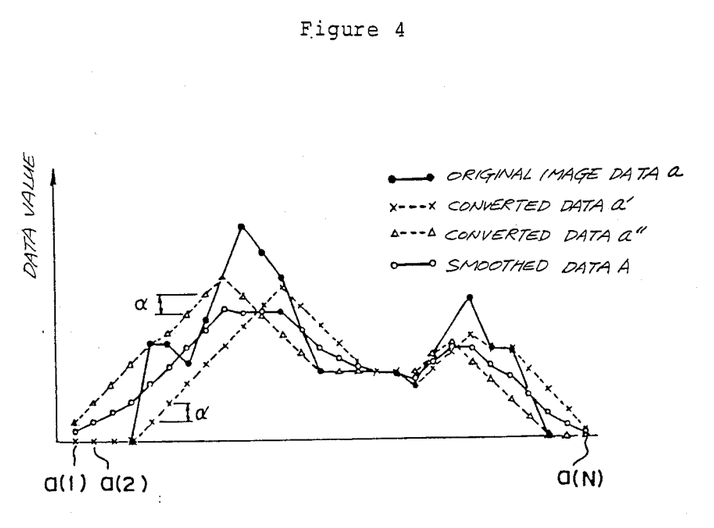
FIG. 4 is a graph explaining how an image data smoothing method of the invention is effective.

Characteristics of the smoothed data will be described with reference to FIG. 4. FIG. 4 shows original image data items $a_1, a_2, \ldots a_N$ (before being smoothed) with respect to the respective pixels in one horizontal row, converted data items $a'_1, a'_2, \ldots a'_N$, converted data items $a''_1, a''_2, \ldots a''_N$, and smoothed data items $A_1, A_2, \ldots A_N$ with respect to the respective pixels in one horizontal row. As illustrated in FIG. 4, the difference between adjacent data items in each of the series of the converted data items $a'_1, a'_2, \ldots a'_N$ and $a''_1, a''_2, \ldots a''_N$ falls within $\alpha$. With the difference between adjacent data items falling within $\alpha$, each of the series of the converted data items varies in a pattern different from that of the series of the original data items $a_1, a_2, \ldots a_N$ (as if the data items were shifted to the right or left). Since a smoothed data item $A_n$ is obtained by averaging converted data items $a'_n$ and $a''_n$, the series of smoothed data items $A_1, A_2, \ldots A_N$ varies in a pattern close to that of the original image data items. Therefore, the constant may be of the same value or substantially the same value when the converted data $a'_n$ and the converted data $a''_n$ are found (this holds true for constants $\beta$, $\gamma$, described later on).

An image data smoothing method according to a second embodiment of the present invention will be described with reference to FIGS. 5 and 6.

Original image data items $a_1, a_2, \ldots a_N$ with respect to a horizontal row of pixels of an image F are sent from the image file 10 to the line buffer memories 11, 21 and processed in exactly the same manner as in the first method, and hence the mean processor 15 issues smoothed data items $A_1, A_2, \ldots A_N$. Smoothed data A with respect to all horizontal pixel rows are temporarily stored in a frame memory 51 shown in FIG. 5 (step P10 in FIG. 6).

Original image data a with respect to the same image F is also input to line buffer memories 31, 41. More specifically, original image data items $a_1, a_2, \ldots a_m, \ldots a_M$ with respect to a vertical column of pixels x(1, n), x(2, n), ... x(m, n), ... x(M, N) shown in FIG. 3 are applied to and stored in the line buffer memories 31, 41. A processor 32 supplied with a constant $\beta$ from a constant generator 33 and an adder 34 process these original image data items $a_1, a_2, \ldots a_m, \ldots a_M$ (stored in the line buffer memory 31) in exactly the same manner as the processor 12 and the adder 14 process the original image data items $a_1, a_2, \ldots a_m, \ldots a_N$ in a horizontal row. The original image data $a_m$ stored in the line buffer memory 31 is converted to data $a'_m$, which is:

$$a'_m = a'_{m-1} + \beta \text{ when } a_m - a'_{m-1} > \beta. \quad (1)$$

$$a'_m = a_m \text{ when } |a_m - a''_{m-1}| \leq \beta. \quad (2)$$

$$a'_m = a'_m - \beta \text{ when } a_m - a'_{m-1} < -\beta. \quad (3)$$

$a'_{m-1}$ indicates converted data which is produced after the original image data $a_{m-1}$ has been converted as described above. The original image data item $a_1$ where $m = 1$ remains as it is and is referred to as a converted data item $a'_1$.

The original image data items $a_1, a_2, \ldots a_m, \ldots a_M$ with respect to the vertical column of pixels, which are also stored in the line buffer memory 41, are processed by a processor 42 and an adder 44 in exactly the same manner as the original image data items $a_1, a_2, \ldots a_n, \ldots a_N$ in a horizontal row are processed by the processor 22 and the adder 24. The original image data $a_m$ stored in the line buffer memory 41 is converted to data $a''_m$, which is:

$$a''_m = a''_{m+1} + \beta \text{ when } a_m - a''_{m-1} > \beta. \quad (1)$$

$$a''_m = a_m \text{ when } |a_m - a''_{m+1}| \leq \beta. \quad (2)$$

$$a''_m = a''_{m+1} - \beta \text{ when } a_m - a''_{m+1} < -\beta. \quad (3)$$

$a''_{m+1}$ indicates converted data which is produced after the original image data $a_{m+1}$ has been converted as described above. The original image data item $a_M$ where m=M remains as it is and is referred to as a converted data item $a''_M$.

The converted data items $a''_1, a''_2, \ldots a''_M$ and $a'_1, a'_2, \ldots a''_M$ are sent to a mean processor 35 that is identical to the mean processor 15. The mean processor 35 determines the mean values of the converted data items with respect to the same pixels. For example, the converted data items $a''_1$ and $a''_1$ with respect to one pixel are processed to obtain their mean value $B_1$:

$$B_1 = (a'_1 + a''_1)/2$$

Figure 6:
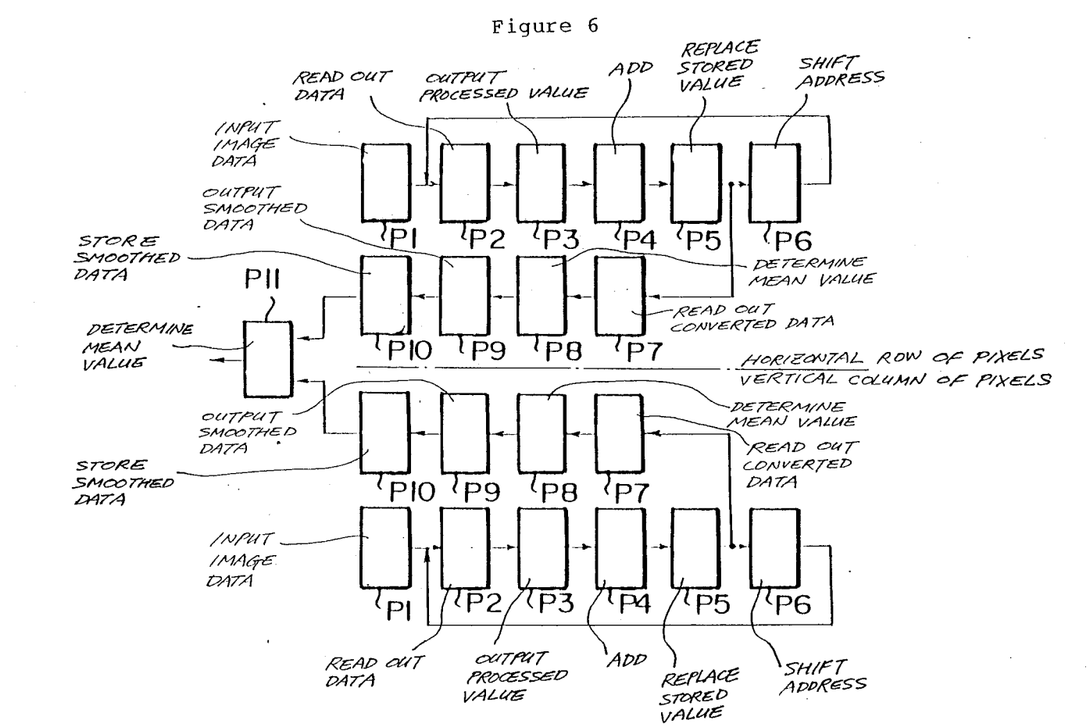
FIG. 6 is a flowchart of processing steps of the image data smoothing method of the second embodiment.

The mean values $B_1, B_2, \ldots B_M$ thus obtained are output from the mean processor 35 as smoothed data items of the original image data items $a_1, a_2, \ldots a_M$ and are temporarily stored in a frame memory 52 (step P10 in FIG. 6).

The processing cycle is repeated to store the smoothed data items B with respect to the pixels of all vertical columns of the image F. Thereafter, the smoothed data B and the smoothed data A, which bear the two-dimensional image, are read out of the frame memories 52, 51, respectively, into a mean processor 53 which then determines the mean values of the smoothed data items A, B for the respective pixels. More specifically, assuming that the smoothed data items in respect of one pixel are (given as Ap, Bp (p represents a two-dimensional pixel position), $$\text{Mean value } C_p = (A_p + B_p)/2$$

The mean values C are determined with respect to all pixels of the image F, and are issued as final smoothed data items from the mean processor 53. The final smoothed data items are delivered to an image processing apparatus for image reproduction or subjected to image data compression.

Since the smoothed data items C are obtained in a two-dimensional plane, they represent smoother data than the smoothed data items A obtained by the first method.

Figure 5:
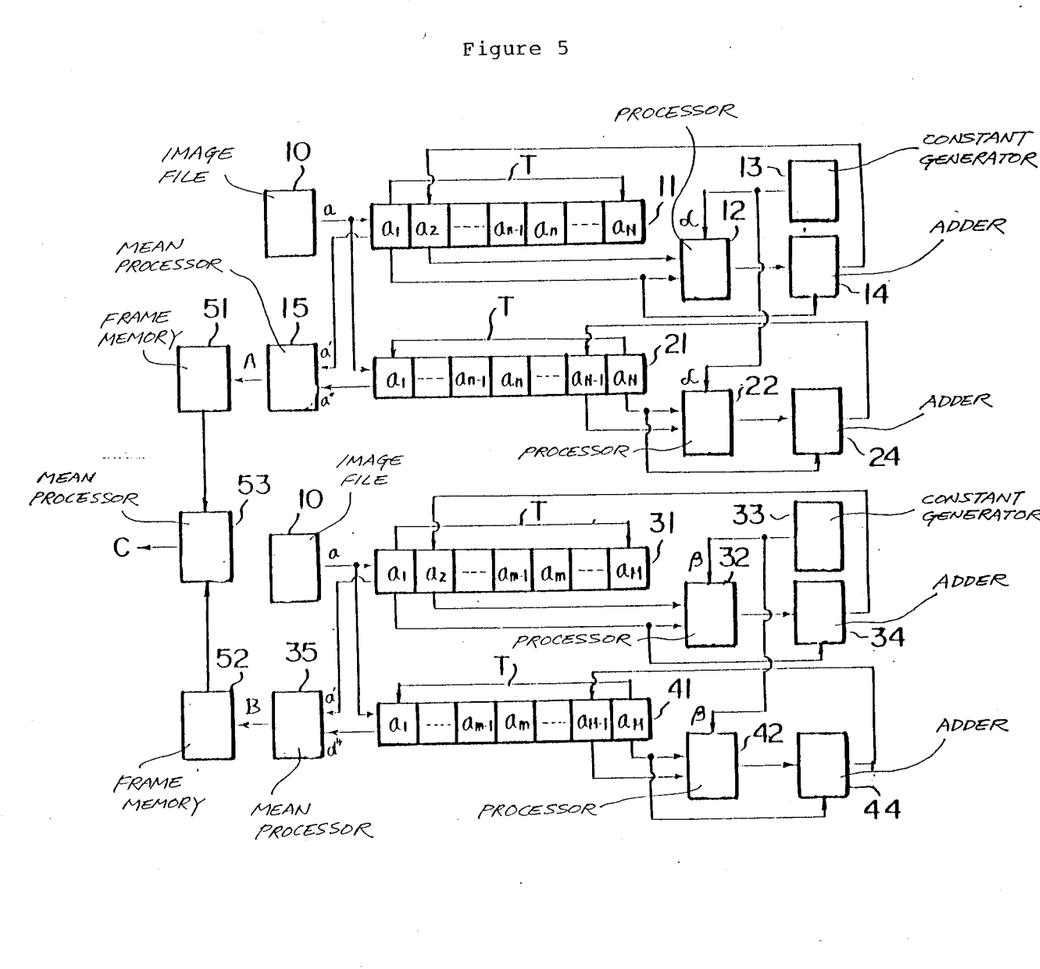
FIG. 5 is a block diagram of a system for carrying out an image data smoothing method according a second embodiment of the present invention.

The system shown in FIG. 5 includes a processing section for smoothing data items with respect to horizontal rows of pixels and another processing section for smoothing data items with respect to vertical columns of pixels. However, the system may have only a single processing section which can be commonly employed for smoothing data items at different times with respect to both horizontal and vertical rows and columns of pixels.

Figure 7:
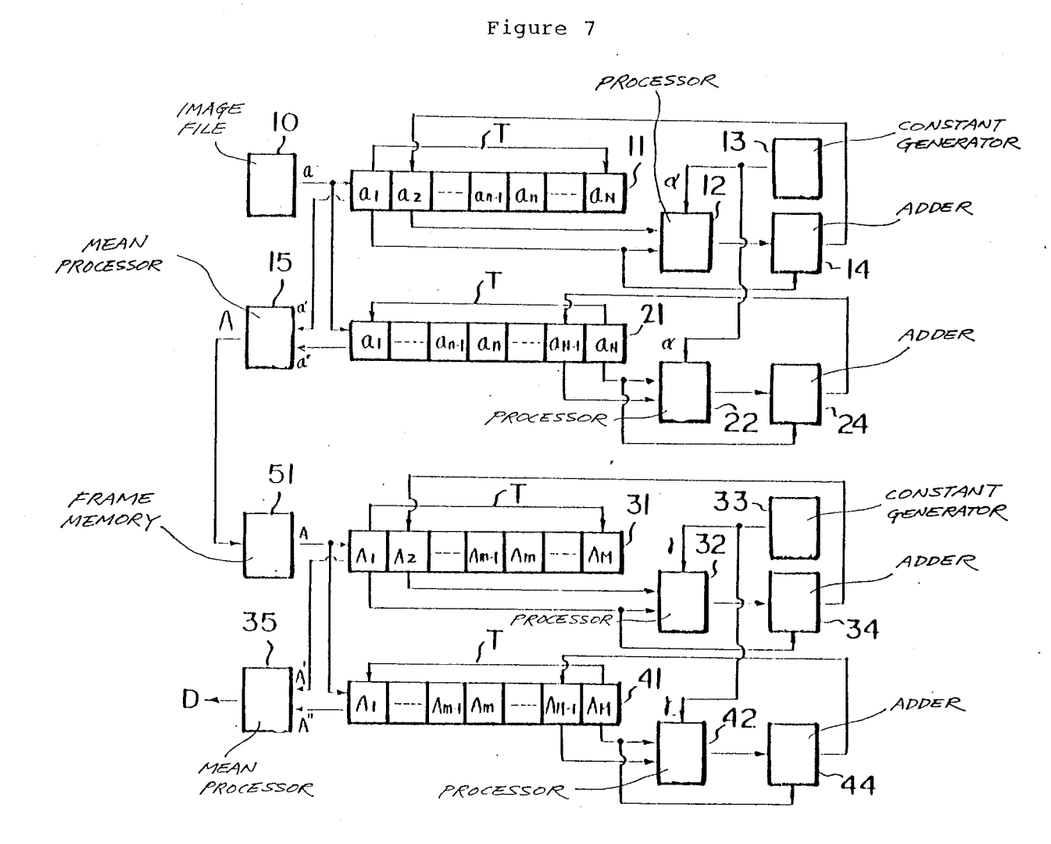
FIG. 7 is a block diagram of a system for carrying out an image data smoothing method according a third embodiment of the present invention.
Figure 8:
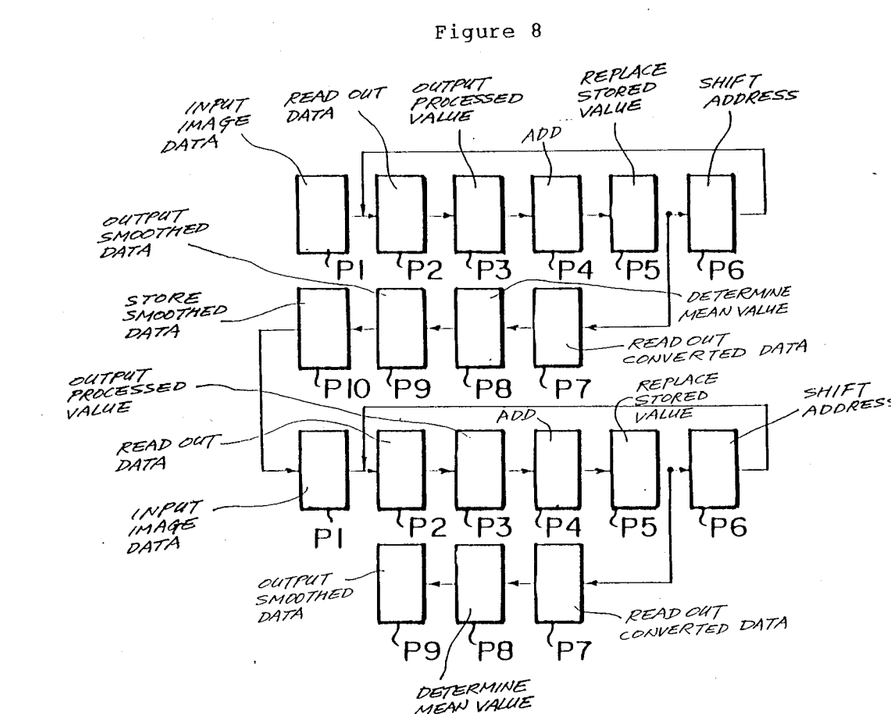
FIG. 8 is a flowchart of processing steps of the image data smoothing method of the third embodiment.

An image data smoothing method according to a third embodiment of the present invention will be described with reference to FIGS. 7 and 8. In the third method, smoothed data items A can be obtained in the same manner as they are obtained in the first or second method. Smoothed data items A which bear a two-dimensional image are temporarily stored in the frame memory 51 as shown in FIG. 7, and thereafter are input to and stored in the line buffer memories 31, 41. In these line buffer memories 31, 41, the smoothed data items A are stored respectively s data items $A_1, A_2, \ldots A_m, \ldots A_M$ with respect to respective pixels $x(1, n), x(2, n), \ldots x(m, n), \ldots x(M, n)$ in a vertical column. The processor 32 and the adder 34 process the smoothed data items $A_1, A_2, \ldots A_m, \ldots A_M$ in exactly the same manner as they process the original image data items $a_1, a_2, \ldots a_m, \ldots a_M$ in the second method. Similarly, the processor 42 and the adder 44 process the smoothed data items $A_1, A_2, \ldots A_m, \ldots A_M$ in exactly the same manner as they process the original image data items $a_1, a_2, \ldots a_m, \ldots a_M$ in the second method. The smoothed data $A_m$ stored in the line buffer memory 31 is therefore converted to data $A'_m$, which is:

$$A'_m = A'_{m-1} + \gamma \text{ when } A_m - A'_{m-1} > \gamma. \quad (1)$$

$$A'_m = A_m \text{ when } |A_m - A'_{m-1}| \leq \gamma. \quad (2)$$

$$A'_m = A40_{m-1} - \gamma \text{ when } A_m - A'_{m-1} < -\gamma. \quad (3)$$

Stated otherwise, the smoothed data item $A_m$ is converted to the median value of $A_m$, $(A'_{m-1}+\gamma)$, and $(A'_{m-1}-\gamma)$. $A'_{m-1}$ indicates converted data which is produced after the smoothed data $A_{m-1}$ has been converted as described above. $\gamma$ indicates a constant applied by the constant generator 33 to the processor 32.

The average data item $A_m$ stored in the line buffer memory 41 is also converted to data $A''_m$, which is:

$$A''_m = A''_{m+1} + \gamma \text{ when } A_m - A''_{m-1} > \gamma. \quad (1)$$

$$A''_m = A_m \text{ when } |A_m - A''_{m+1}| \leq \gamma. \quad (2)$$

$$A''_m = A''_{m+1} - \gamma \text{ when } A_m - A''_{m+1} < -\gamma. \quad (3)$$

Stated otherwise, the smoothed data item $A_m$ is converted to the median value of $A_m$, $(A''_{m+1}+\gamma)$, and $(A''_{m+1}-\gamma)$. $A''_{m+1}$ indicates converted data which is produced after the smoothed data $A_{m+1}$ has been converted as described above.

The converted data items $A''_1, A''_2, \ldots A''_M$ and $A''_1, A''_2, \ldots A'_M$ thus obtained are sent to the mean processor 35, which determines the mean values of the converted data items with respect to the same pixels. For example, the converted data items $A'_1$ and $A''_1$ with respect to one pixel are processed to obtain their mean value $D_1$:

$$D_1 = (A'_1 + A''_1)/2$$

The mean values $D_1, D_2, \ldots D_M$ thus obtained are output from the mean processor 35 as final smoothed data items of the original image data a.

Since the smoothed data items D are obtained in a two-dimensional plane, like the final smoothed data items C produced by the second method, they represent smoother data than the smoothed data items A obtained by the first method.

The system shown in FIG. 7 may have only a single processing section which can be commonly employed for smoothing data items of pixels in a horizontal row (original image data a) and smoothing data items of pixels in a vertical column (smoothed data A) at different times.

Although certain preferred embodiments have been shown and described, it should be understood that many changes and modifications may be made therein without departing from the scope of the appended claims.

I claim:

1. A method of smoothing image data, comprising the steps of:
   (i) providing original image data items $a_1, a_2, \ldots a_N$ with respect to a series of pixels in a two-dimensional image, and a constant $\alpha$;

(ii) converting $a_n$ to $a'_n$ which is the median value of $a_n$, $(a'_{n-1}+\alpha)$, and $(a'_{n-1}-\alpha)$ (where $a'_{n-1}$ is a converted data item which is produced by converting the original image data item $a_{n-1}$ to a median value);

(iii) converting $a_n$ to $a''_n$ which is the median value of $a_n$, $(a''_{n+1}+)$, and $(a''_{n+1}-)$ (where $a''_{n+1}$ is a converted data item which is produced by converting the original image data item $a_{n+1}$ to a median value); and (iv) determining the mean value $A_n$ of the converted data items $a'_n$ and $a''_n$ with respect to the same pixel and employing the determined mean value $A_n$ as smoothed data.

2. A method of smoothing image data, comprising the steps of:

(i) providing original image data items $a_1, a_2, \ldots a_N$ with respect to a horizontal row of pixels in a two-dimensional image, and a constant;

(ii) converting $a_n$ to $a'_n$ which is the median value of $a_n$, $(a'_{n-1}+\alpha)$, and $(a'_{n-1}-\alpha)$ (where $a'_{n-1}$ is a converted data item which is produced by converting the original image data item $a_{n-1}$ to a median value);

(iii) converting $a_n$ to $a''_n$ which is the median value of $a_n$, $(a''_{n+1}+\alpha)$, and $(a''_{n+1}-\alpha)$ (where $a''_{n+1}$ is a converted data item which is produced by converting the original image data item $a_{n+1}$ to a median value);

(iv) determining the mean value $A_n$ of the converted data items $a'_n$ and $a''_n$ with respect to the same pixel;

(v) providing original image data items $a_1, a_2, \ldots a_M$ with respect to a vertical column of pixels which extends transversely to said horizontal row, and a constant $\beta$;

(vi) converting $a_m$ to $a'_m$ which is the median value of $a_m$, $(a'_{m-1}+\beta)$, and $(a'_{m-1}-\beta)$ (where $a'_{m-1}$ is a converted data item which is produced by converting the original image data item $a_{m-1}$ to a median value);

(vii) converting $a_m$ to $a''_m$ which is the median value of $a_m$, $(a''_{m+1}+\beta)$, and $(a''_{m+1}-\beta)$ (where $a''_{m+1}$ is a converted data item which is produced by converting the original image data item $a_{m+1}$ to a median value);

(viii) determining the mean value $B_m$ of the converted data items $a'_m$ and $a''_m$ with respect to the same pixel; and (ix) determining the mean value C of the mean values A, B with respect to the same pixel and employing the determined mean value as smoothed data.

3. A method of smoothing image data, comprising the steps of:

(i) providing original image data items $a_1, a_2, \ldots a_N$ with respect to a horizontal row of pixels in a two-dimensional image, and a constant $\alpha$;

(ii) converting $a_n$ to $a'_n$ which is the median value of $a_n$, $(a'_{n-1}+\alpha)$, and $(a'_{n-1}-\alpha)$ (where $a'_{n-1}$ is a converted data item which is produced by converting the original image data item $a_{n-1}$ to a median value);

(iii) converting $a_n$ to $a''_n$ which is the median value of $a_n$, $(a''_{n+1}+\alpha)$, and $(a''_{n+1}-\alpha)$ (where $a''_{n+1}$ is a converted data item which is produced by converting the original image data item $a_{n+1}$ to a median value);

(iv) determining the mean value $A_n$ of the converted data items $a'_n$ and $a''_n$ with respect to the same pixel;

(v) arranging determined mean values $A_1, A_2, \ldots A_M$ in a vertical column of pixels which extends transversely to said horizontal row, and a constant $\gamma$;

(vi) converting $A_m$ to $A'_m$ which is the median value of $A_m$, $(A'_{m-1}+\gamma)$, and $(A'_{m-1}-\gamma)$ (where $A'_{m-1}$ is a converted data item which is produced by converting the original image data item $A_{m-1}$ to a median value);

(vii) converting $A_m$ to $A''_m$ which is the median value of $A_m$, $(A''_{m+1}+\gamma)$, and $(A''_{m+1}-\gamma)$ (where $A''_{m+1}$ is a converted data item which is produced by converting the original image data item $A_{m+1}$ to a median value); and (viii) determining the mean value $D_m$ of the converted data items $A'_m$ and $A''_m$ with respect to the same pixel and employing the determined mean value as smoothed data.

4. An apparatus for smoothing image data comprising:

(i) image data means for providing original image data items $a_1, a_2, \ldots a_N$ with respect to a series of pixels in a two-dimensional image, and a constant $\alpha$;

(ii) first converting means for converting $a_n$ to $a'_n$ which is the median value of $a_n$, $(a'_{n-1}+\alpha)$, and $(a'_n-\alpha)$ (where $a'_{n-1}$ is a converted data item which is produced by converting the original image data item $a_{n-1}$ to a median value);

(iii) second converting means for converting $a_n$ to $a''_n$ which is the median value of $a_n$, $(a''_{n+1}+\alpha)$, and $(a''_{n+1}-\alpha)$ (where $a''_{n+1}$ is a converted data item which is produced by converting the original data item $a_{n+1}$ to a median value; and (iv) smoothing means for determining the mean value $A_n$ of the converted data items $a'_n$ and $a''_n$ with respect to the same pixel and employing the determined mean value $A_n$ as smoothed data.

5. An apparatus for smoothing image data comprising:

(i) row image data means for providing original image data items $a_1, a_2, \ldots a_N$ with respect to a horizontal row of pixels in a two-dimensional image, and a constant $\alpha$;

(ii) first row converting means for converting $a_n$ to $a'_n$ which is the median value of $a_n$, $(a'_{n-1}+\alpha)$, and $(a'_{n-1}-\alpha)$ (where $a'_{n-1}$ is a converted data item which is produced by converting the original image data item $a_{n-1}$ to a median value);

(iii) second row converting means for converting $a_n$ to $a''_n$ which is the median value of $a_n$, $(a''_n+'\alpha)$, and $(a''_{n+1}-\alpha)$ (where $a''_{n+1}$ is a converted data item which is produced by converting the original image data item $a_{n+1}$ to a median value);

(iv) row determination means for determining the mean value $A_n$ of the converted data items $a'_n$ and $a''_n$ with respect to the same pixel;

(v) column image data means for providing original image data items $a_1, a_2, \ldots a_M$ with respect to a vertical column of pixels which extends transversely to said horizontal row, and a constant $\beta$;

(vi) first column converting means for converting $a_m$ to $a'_m$ which is the median value of $a_m$, $(a'_{m-1}+\beta)$, and $(a'_{m-1}-\beta)$ (where $a'_{m-1}$ is a converted data item which is produced by converting the original image data item $a_{m-1}$ to a median value);

(vii) second column converting means for converting $a_m$ to $a''_m$ which is the median value of $a_m$, $(a''_{m+1}+\beta)$, and $(a''_{m+1}-\beta)$ (where $a''_{m+1}$ is a converted data item which is produced by converting the original image data item $a_{m+1}$ to a median value);

(viii) column determination means for determining the mean value $B_m$ of the converted data items $a'_m$ and $a''_m$ with respect to the same pixel; and (ix) smoothing means for determining the mean value C of the mean values A, B with respect to the same pixel and employing the determined mean value as smoothed data.

6. An apparatus for smoothing image data comprising:

(i) row image data means for providing original image data items $a_1, a_2, \ldots a_N$ with respect to a horizontal row of pixels in a two-dimensional image, and a constant $\alpha$;

(ii) first converting means for converting $a_n$ to $a'_n$ which is the median value of $a_n$, $(a'_{n-1}+\alpha)$, and $(a'_{n-1}-\alpha)$ (where $a'_{n-1}$ is a converted data item which is produced by converting the original image data item $a_{n-1}$ to a median value);

(iii) second converting means for converting $a_n$ to $a''_n$ which is the median value of $a_n$, $(a''_{n+1}+\alpha)$, and $(a'_{n+1}-\alpha)$ (where $a''_{n+1}$ is a converted data item which is produced by converting the original image data item $a_{n+1}$ to a median value);

(iv) row determination means for determining the mean value $A_n$ of the converted data items $a'_n$ and $a''_n$ with respect to the same pixel;

(v) column image data means for arranging determined mean values $A_1, A_2, \ldots A_M$ in a vertical column of pixels which extends transversely to said horizontal row, and a constant $\gamma$;

(vi) first column converting means for converting $A_m$ to $A'_m$ which is the median value of $A_m$, $(A'_{m-1}+\gamma)$, and $(A''_{m-1}-\gamma)$ (where $A'_{m-1}$ is a converted data item which is produced by converting the original image data item $A_{m-1}$ to a median value);

(vii) second column converting means for converting $A_m$ to $A''_m$ which is the median value of $A_m$, $(A''_{m+1}+\gamma)$, and $(A''_{m+1}-\gamma)$ (where $A''_{m+1}$ is a converted data item which is produced by converting the original data item $A_{m+1}$ to a median value); and (viii) smoothing means for determining the mean value $D_m$ of the converted data items $A'_m$ and $A''_m$ with respect to the same pixel and employing the determined mean value as smoothed data.

* * * * *